W. E. HOLLAND.
BATTERY CHARGE INDICATION.
APPLICATION FILED JUNE 10, 1911
1,045,291.
Patented Nov. 26, 1912.
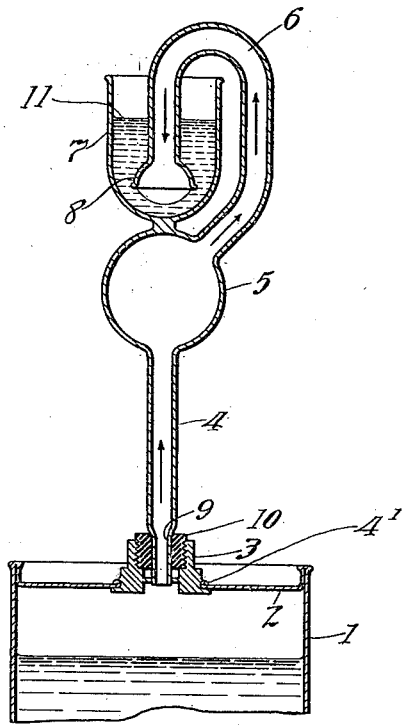
Witnesses:
Inventor:
Walter E. Holland,
by Frank L. Dyer,
his Atty.

UNITED STATES PATENT OFFICE.

WALTER E. HOLLAND, OF EAST ORANGE, NEW JERSEY, ASSIGNOR TO EDISON STORAGE BATTERY COMPANY, OF WEST ORANGE, NEW JERSEY, A CORPORATION OF NEW JERSEY.

BATTERY-CHARGE INDICATION.

1,045,291.  Specification of Letters Patent.  Patented Nov. 26, 1912.

Application filed June 10, 1911. Serial No. 632,365.

*To all whom it may concern:*

Be it known that I, WALTER E. HOLLAND, a citizen of the United States, and a resident of East Orange, Essex county, New Jersey, have invented certain new and useful Improvements in Battery-Charge Indication, of which the following is a specification.

My invention relates generally to a method for determining and to means for indicating to what extent a storage battery has been charged during the charging operation, and more particularly to an improved device for this purpose which is simple in construction and efficient in operation.

In the accompanying drawing which forms a part of this specification, I have illustrated in a vertical sectional view one embodiment of my improved battery charge indicator in operative relation to a storage battery.

The battery containing can 1 is provided with the top 2 in which is secured a nipple or plug 3 by a beaded flange 4'. This construction is the same as that shown in the patent to Edison, No. 821,624, granted May 29, 1906, in which the nipple or plug 3 forms a part of the gas vent described in the said patent. This nipple or plug may be used for the reception of my improved charge indicator, but obviously any convenient form of opening in the containing battery can or jar may be utilized for this purpose.

My improved battery charge indicator comprises a vent pipe or tube having an elongated stem portion 4, an enlarged portion 5 and an upper end portion 6 bent over and extending into a reservoir 7. The reservoir 7 is preferably of bell or cup shape with thin walls, or other form adapted to pulsate, and may be mounted on the enlarged portion 5. The end of the vent tube extending into the reservoir is enlarged, as is shown at 8. The other end of the vent tube has a reduced portion 9 forming a shoulder around the lower part of the tube and fitting tightly into a cork, rubber, or other suitable stopper 10, the said stopper being adapted to be inserted in the opening of the nipple or plug 3. The device comprising the reservoir and the vent pipe or tube may be made of either transparent or opaque material, such as glass, metal or hard rubber, and is preferably made of durable and elastic or resilient material.

My improved battery charge indicator is used as follows:—The device is inserted into a suitable opening in the battery containing can or jar, and the reservoir 7 is partially filled with water or some other suitable liquid to a level above the opening 8 of the upper end of the vent pipe, as is shown in the drawing. The reservoir 7 or the portion of the vent tube within the reservoir is preferably provided with a mark to indicate the height to which the reservoir should be filled with liquid. All openings in the battery containing can or jar except that by way of the vent tube 4 are closed. While the battery is being charged, gases are given off which pass through the vent tube 4 and escape from the upper end of the said tube through the liquid 11 in bubbles As each bubble of gas escapes, a distinct throb or pulsation is produced in the reservoir, which may be felt by touching any part of the device. It has been found that as the battery becomes more fully charged, the number of bubbles given off in any definite interval of time increases. An observer is therefore enabled to determine the extent to which the battery has been charged by counting the number of bubbles given off in a given time. The bubbles may be observed visually, or by noting the throbs or pulsations produced in the device as the bubbles are given off. The throbs or pulsations may be conveniently observed by holding the reservoir between the thumb and finger, or otherwise in the hand. The throbs or pulsations may, however, be observed by touching any part of the device. It is preferable to employ the sense of touch and count the pulsations produced by the bubbles, because this method leaves the eye of the observer free to note the time. In order to render the device more convenient to use, it should be calibrated by charging the battery at different rates and noting the number of bubbles per half-minute or per minute, or other convenient unit of time corresponding to different fractions of full charge at various charging rates. Curves showing these results may be plotted on cross section paper with the number of bubbles per unit of time as ordinates, and the ampere hours of charge as abscissæ. In charging a battery, the charging rate is measured by an ammeter, and if the observer counts the number of bubbles given off in a unit of time, he can by reference to the curves, determine to what extent the battery has been charged and also when it is fully charged.

The end of the vent tube extending into the reservoir is enlarged for the purpose of increasing the size and decreasing the number of the bubbles given off and thereby enabling them to be more readily counted, whether observed by the eye or by the sense of touch. The gases given off from a battery during charging carry with them portions of the electrolyte, and the object of the enlarged portion 5 of the vent tube is to decrease the velocity of the electrolyte carried by the gases and permit it to be deposited on the walls of the enlarged portion and run back into the battery containing can or jar. The shape of the device, and particularly of the reservoir, is such as to accentuate the throbs or pulsations as the gas bubbles are given off and render them more easily observed by the sense of touch, and the use of elastic or resilient material also contributes to this result.

Having now described my invention, what I claim as new and desire to secure by Letters Patent of the United States is as follows:—

1. A method for determining to what extent a storage battery has been charged during the charging operation, which consists in producing mechanical pulsations by the gas bubbles given off from the battery, and observing the number of such pulsations in an interval of time, substantially as set forth.

2. The combination of a storage battery cell, and means for indicating the condition of charge thereof, comprising a device adapted to be caused to pulsate perceptibly by the gas bubbles given off from the cell during charging, substantially as described.

3. A battery charge indicator comprising a reservoir capable of pulsating perceptibly, a vent pipe or tube having one end extending into the reservoir and the other end adapted to be inserted into the battery cell, substantially as described.

4. A battery charge indicator comprising a cup or bell shaped reservoir for containing a liquid, a vent pipe or tube having one end extending into the reservoir and the other end adapted to be inserted into the battery cell, substantially as described.

5. A battery charge indicator comprising a reservoir for containing a liquid, and a vent pipe or tube having one end enlarged and extending into the reservoir, and the other end adapted to be inserted into a battery cell, whereby gases generated in the battery cell during charging may be conducted from the cell to the reservoir, substantially as described.

6. A battery charge indicator comprising a reservoir for containing a liquid, and a vent pipe or tube having one end extending into the reservoir and the other end adapted to be inserted in a battery cell, whereby gases generated in the battery cell during charging may be conducted from the cell to the reservoir, and the said pipe being provided with means for reducing the velocity of gas flow through a portion thereof, substantially as described.

7. A battery charge indicator comprising a reservoir for containing a liquid, and a vent pipe or tube having one end extending into the reservoir and the other end adapted to be inserted in a battery cell, whereby gases generated in the battery cell during charging may be conducted from the cell to the reservoir, and the said pipe being provided with an enlarged portion intermediate the ends thereof, substantially as described.

8. A battery charge indicator comprising a cup or bell shaped reservoir and a vent tube or pipe having an elongated stem portion, an enlarged portion communicating with the stem portion, and a bent over portion leading from the enlarged portion into the reservoir, the said reservoir being mounted on the enlarged portion of the said vent pipe or tube, substantially as described.

9. A method for determining to what extent a storage battery has been charged during the charging operation, which consists in producing mechanical pulsations by the gas bubbles given off from the battery, and observing the number of such pulsations in an interval of time by the sense of touch, substantially as set forth.

10. A battery charge indicator comprising a cup or bell shaped reservoir and a vent tube or pipe, the said tube or pipe having a stem portion, the lower end of which is adapted to be inserted in a battery cell and the upper end of which is provided with a chamber, and a bent-over portion leading from the chamber and extended into the reservoir, the opening in the end of the said bent-over portion extended into the reservoir being enlarged, substantially as described.

This specification signed and witnessed this 6th day of June 1911.

WALTER E. HOLLAND.

Witnesses:
HENRY LANAHAN,
ANNA R. KLEHM.